Figure 1:
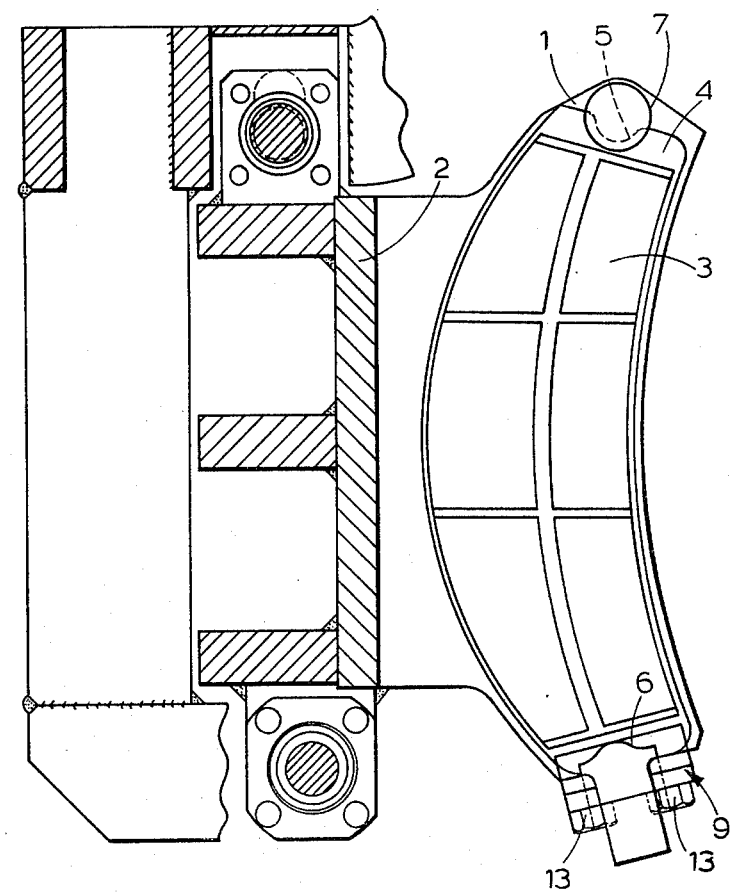

United States Patent [19]

Bayliss

[11] 4,236,612
[45] Dec. 2, 1980

[54] FRICTION PAD ASSEMBLIES FOR RAIL VEHICLE BRAKES

[75] Inventor: John P. Bayliss, Redditch, England

[73] Assignee: Girling Limited, Birmingham, England

[21] Appl. No.: 23,678

[22] Filed: Mar. 26, 1979

[30] Foreign Application Priority Data

Apr. 8, 1978 [GB] United Kingdom ............... 13858/78

[51] Int. Cl.³ ............................................. F16D 65/04
[52] U.S. Cl. ................................................... 188/242
[58] Field of Search ................ 188/73.5, 73.6, 205 A, 188/234, 242, 244, 250 B, 250 F; 192/30 V, 70.13

[56] References Cited

U.S. PATENT DOCUMENTS

| | | | |
|---|---|---|---|
| 3,171,516 | 3/1965 | Parton | 188/234 |
| 3,435,926 | 4/1969 | Lee | 188/242 |

FOREIGN PATENT DOCUMENTS

| | | | |
|---|---|---|---|
| 2547530 | 4/1977 | Fed. Rep. of Germany | 188/73.5 |
| 1020382 | 2/1966 | United Kingdom | 188/234 |

*Primary Examiner*—Edward R. Kazenske
*Attorney, Agent, or Firm*—Scrivener, Parker, Scrivener and Clarke

[57] ABSTRACT

A friction pad assembly for a rail vehicle brake comprises a pad of friction material carried by a rigid backing plate, and the backing plate is detachably mounted on a shoe. A part-circular notch at one end of the shoe receives the stem of a headed stud which acts as an abutment for that end of the backing plate, and the backing plate is urged into engagement with the stud by means of a keeper which acts on the opposite end of the backing plate. The keeper comprises a stop member in combination with a relatively movable resilient abutment comprising a strip of metal which is bent into a loop and of which a forward terminal projection of part-circular outline is received in a notch of complementary outline in the other end of the backing plate.

4 Claims, 6 Drawing Figures

FRICTION PAD ASSEMBLIES FOR RAIL VEHICLE BRAKES

SPECIFIC DESCRIPTION

This invention relates to friction pad assemblies for rail vehicle brakes of the kind in which a pad of friction material is carried by a rigid backing plate, and the backing plate is detachably mounted on a shoe by means of which the pad can be applied to a rotatable disc or wheel in a brake.

Numerous constructions of friction pad assemblies for rail vehicle brakes have been proposed with a view to ensuring that backing plates can be readily detachable from a shoe for pad replacement without having in any other way to dismantle the brake. In most known constructions the backing plate is retained against movement with respect to the shoe between an abutment at one end of the shoe and a keeper which is detachably secured to the shoe at the other end. Opposite ends of the backing plate co-operate with the abutment and the shoe so that, upon removal of the keeper, the backing plate can be detached from the shoe, simply by sliding it over the shoe to disengage the backing plate from the abutment. When the assembly is installed in a brake, after removal of the keeper, the pad can be withdrawn through an end of the brake in a chordal direction. In some known constructions in which the keeper is rigidly secured to the shoe, difficulty is experienced in compensating for tolerance variations which may affect the distance between the abutment and the keeper, and between opposite ends of the backing plate. Thus, even when the keeper is firmly attached to the shoe, the backing plate can move relative to the shoe through a short distance sufficient to cause rattle in a "brakes-off" condition, and impact noise with the abutment or keeper when the brake is applied.

According to our invention in a friction pad assembly of the kind set forth having a keeper for holding the backing plate against an abutment on the shoe, the keeper comprises a stop member adapted to be detachably secured to an end of the shoe, in combination with a relatively movable resilient abutment member which is secured to, and projects through an opening in, the stop member to engage at its free end with an adjacent end of the backing plate, and the abutment member includes a portion which is spaced from the stop member and is of an area greater than the opening to transmit to the stop member any force on the pad which is in excess of the resilient loading of the abutment member.

When the keeper is attached to a shoe the abutment member acts to urge the shoe at its opposite end into engagement with the abutment on the shoe and, according to tolerance variations, the abutment member may deflect by a greater or less amount with respect to the stop member. In any case, irrespective of the degree of deflection, the said greater area portion will still be spaced from the stop member. Under excess braking forces in which the shoe in a direction away from the abutment, against the resilient loading of the abutment member, the excessive forces are transmitted to the stop member by the engagement with it of the said portion. At the termination of the brake application the resilience of the abutment member is sufficient to restore the pad to its original position.

In one construction the stop member comprises a flat plate, and the abutment member comprises a flat strip which is deformed in a loop having a planar terminal portion which projects through the opening and is formed adjacent to its free end with a pair of lugs which engage at their forward faces with the end of the backing plate, and at their rear faces are spaced from the plate on opposite sides of the opening.

Figure 2:
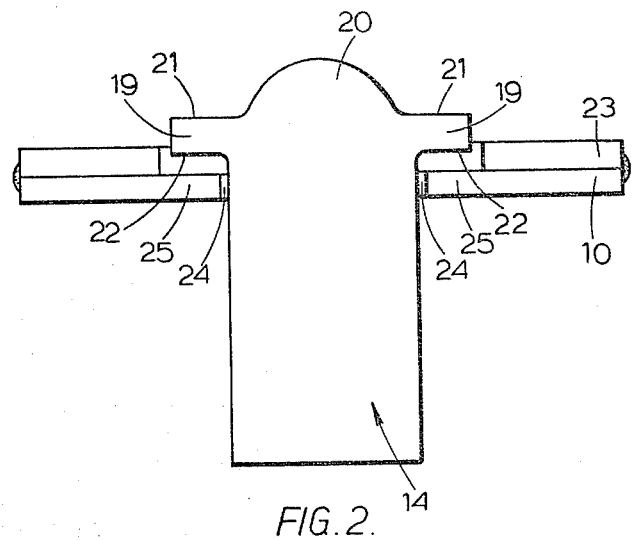
Figure 3:
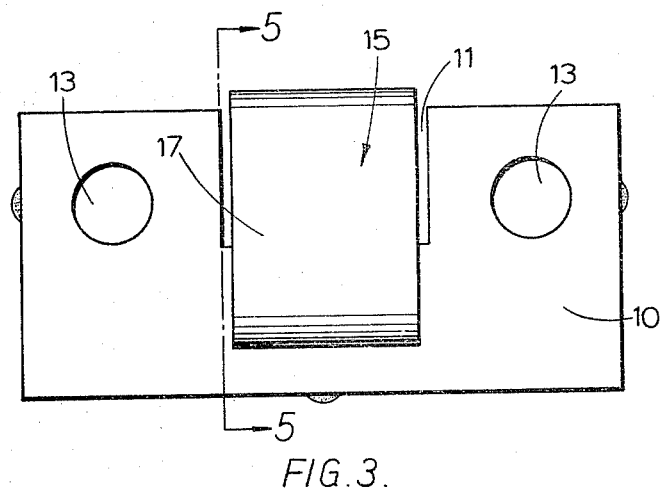
Figure 4:
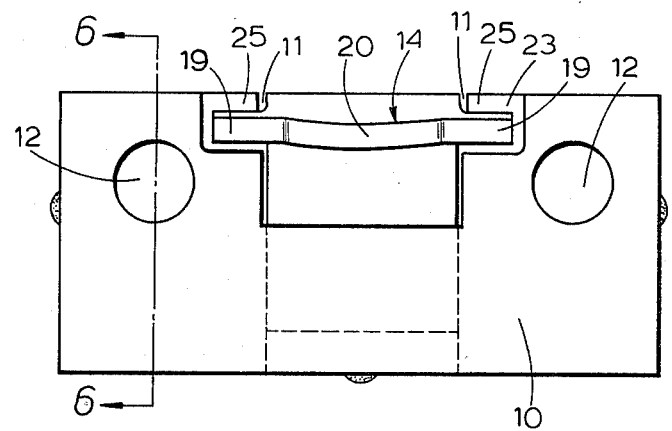
Figure 5:
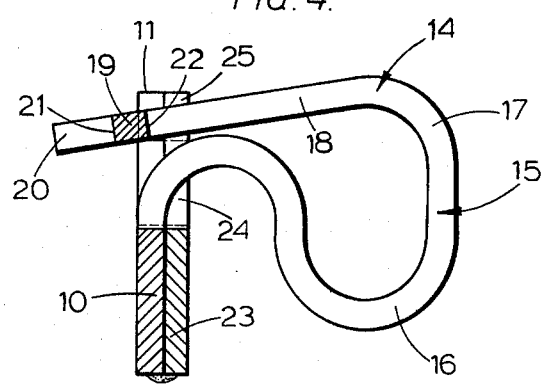
Figure 6:
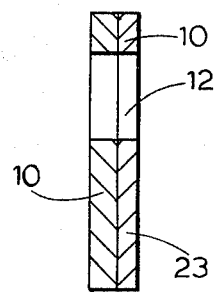

One embodiment of our invention is illustrated in the accompanying drawings in which:

FIG. 1 is an elevation of a friction pad assembly for a rail vehicle disc brake showing part of the brake;
FIG. 2 is a plan of the keeper;
FIG. 3 is a view of the outer end of the same;
FIG. 4 is a view of the inner end;
FIG. 5 is a section on the line 5—5 of FIG. 3; and
FIG. 6 is a section on the line 6—6 of FIG. 4.

In the drawings a friction pad assembly comprises a metal shoe 1 mounted in a caliper 2, and a friction pad 3 which is carried by a rigid metal backing plate 4 detachably mounted on the shoe 1 and is adapted to engage one face of a disc rotatable with an axle of a rail vehicle. The backing plate 4 is of greater area than the pad 3 and projects beyond the pad 3, particularly at opposite ends in which are formed part-circular notches 5 and 6.

The notch 5 receives the stem of a headed stud 7 under which that end of the backing plate 4 is received. The stud 7 acts as an abutment for that end of the backing plate 4, and serves to prevent that end from moving axially away from the shoe 1.

A keeper 9 secures the opposite end of the backing plate 4 to the shoe 1. As illustrated the keeper 9 comprises a stop member 10 in the form of a metal plate of oblong rectangular outline and a notch 11 of generally Tee outline is formed in the plate 10 substantially at the mid-point in its upper edge. The plate is provided at opposite ends of the notch 11 with spaced openings 12 to receive bolts 13 by means of which the plate can be clamped against one end of the shoe 1.

An abutment member 14 is integral with the stop member 10. As illustrated the abutment member 14 comprises a flat strip 15 of metal which extends from the plate 10. The strip 15 is bent into a sinuous portion 16 which extends rearwardly back through the notch 11 and then, by means of a loop 17, back on itself passing through the notch 11 in the opposite direction. Finally the strip 15 terminates at the end of a straight portion 18 which is inclined to a normal to the plate 10 in a pair of laterally projecting lugs 19 on opposite sides of a forward projection 20 of substantial semicircular outline. The lugs 19 are parallel sided. Faces 21 remote of the lugs 19 which are remote from the stop member 11 are engageable with the end of the backing plate 4 with the projection 20 received in a recess 6 of complementary outline in the backing plate 4. Opposite faces 22 of the lugs 19 overlie portions of the notch 11 in the stop member 10.

Finally, a stop plate 23 of oblong rectangular outline is superimposed upon, and secured to, the plate 10. The plate 23 has a notch 24 which is superimposed upon the vertical region of the notch 11 so that the faces 22 of the lugs 19 are normally spaced from stop portions 25 of the plate 23 on opposite sides of the notch 24.

In use the keeper 9 is bolted by the bolts 13 to the end of the shoe 1 and the lugs 19 act on the adjacent end of the backing plate 4 to urge it into engagement with the stud 7 at the opposite end, with the abutment member 14 deflecting resiliently as necessary to accomodate manufacturing tolerances as the stop member 10 is clamped against the shoe. In this position the faces 22 of the lugs 19 will still be spaced from the stop portion 25 on the plate 23.

Should the friction pad 3 be subjected to an excessive drag-force which is sufficient to cause the backing plate 4 to slide on the shoe relatively away from the stud 7 against the resilience of the abutment member 14, the lugs 19 engage with the stop portions 25 so that the drag is transmitted directly through them and the stop member 10 and onto the shoe 1 through the bolts 13. Upon release of the drag force, the resilience in the strip 15 is sufficient to return the backing plate 3 to its previous position.

A keeper similar to the keeper 9 may replace the stud 7.

In a modification the backing plate 4 may be provided with a tongue of dove-tail outline which is slidably received in a slot in the shoe 1 which is of complementary outline. The slot either terminates short of one end of the shoe to define an abutment for a corresponding end of the backing plate, or a portion at that end of the groove is closed or otherwise provided with an abutment.

I claim:

1. A friction pad assembly for a rail vehicle brake comprising a pad of friction material, a rigid backing plate carrying said pad, a shoe upon which said backing plate is detachably mounted, an abutment on said shoe for engagement by said backing plate, a keeper for holding said backing plate in engagement with said abutment, wherein said keeper comprises a stop member adapted to be detachably secured to an end of said shoe and provided with an opening, in combination with a relatively movable resilient abutment member which is secured to said stop member and projects through said opening in said stop member to engage at a free end thereof with an adjacent end of said backing plate, and said abutment member includes a portion which is spaced from said stop member and is of an area greater than said opening to transmit to said stop member any force on said pad which is in excess of the resilient loading of said abutment member.

2. A friction pad assembly as claimed in claim 1, wherein said stop member comprises a flat plate, and said abutment member comprises a flat strip which is deformed into a loop having a planar terminal portion which projects through said opening, said loop being formed adjacent to said free end with a pair of lugs, said lugs having forward faces which engage with said end of backing plate, and rear faces which are spaced from said plate on opposite sides of said opening.

3. A friction pad assembly as claimed in claim 2, wherein said terminal portion includes a forward projection of semi-circular outline and said backing plate has a notch of an outline complementary to that of said projection and in which said projection is received.

4. A friction pad assembly as claimed in claim 2, wherein said keeper comprises a pair of first and second plates with said strip being integral with the first plate and said second plate being provided with stop portions over which said lugs are superimposed, said lugs normally being spaced from said stop portions but engageable therewith against the resilience of said strip to take drag on said friction pad when an excessive drag-force causes said backing plate to slide with respect to said shoe.

* * * * *